United States Patent
McConnell et al.

(10) Patent No.: US 7,261,286 B2
(45) Date of Patent: Aug. 28, 2007

(54) TWO STAGE HOOD LIFT SPRING ASSEMBLY

(75) Inventors: Phillip A. McConnell, Genoa, OH (US); Jack W. Adoline, Toledo, OH (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 10/631,514

(22) Filed: Jul. 31, 2003

(65) Prior Publication Data

US 2004/0113341 A1 Jun. 17, 2004

(51) Int. Cl.
B60G 13/00 (2006.01)

(52) U.S. Cl. ............... 267/195; 267/168; 267/291; 180/69.21; 188/300

(58) Field of Classification Search .............. 267/195, 267/70, 90–92, 155–157, 166, 168, 170, 267/202, 203, 250, 289, 290, 291, 286; 180/69.2, 180/69.21, 89.17; 296/76; 188/300, 322.22
See application file for complete search history.

(56) References Cited

U.S. PATENT DOCUMENTS

| | | | |
|---|---|---|---|
| 1,329,561 A * | 2/1920 | Thompson | 267/290 |
| 4,126,302 A | 11/1978 | Curnutt | |
| 4,162,062 A | 7/1979 | Strauss | |
| 4,274,515 A | 6/1981 | Bourcier De Carbon | |
| 4,328,960 A | 5/1982 | Handke et al. | |
| 4,596,383 A * | 6/1986 | Howard | 267/64.12 |
| 4,744,548 A * | 5/1988 | Hathaway | 267/64.12 |
| 4,890,703 A * | 1/1990 | Hathaway | 188/300 |
| 4,938,520 A * | 7/1990 | Shelton | 296/76 |
| 4,973,097 A * | 11/1990 | Hosan et al. | 296/76 |
| 4,991,675 A | 2/1991 | Tosconi et al. | |
| 5,095,581 A | 3/1992 | Sarto | |
| 5,358,225 A * | 10/1994 | Volpel et al. | 267/64.12 |
| 5,529,148 A * | 6/1996 | O'Leary | 188/67 |
| 5,730,239 A | 3/1998 | Holter | |
| 5,890,556 A | 4/1999 | Shearn et al. | |
| 5,975,228 A | 11/1999 | Parfitt | |
| 6,179,100 B1 * | 1/2001 | Mintgen et al. | 188/282.1 |
| 6,220,406 B1 | 4/2001 | DeMolina et al. | |
| 6,273,405 B2 * | 8/2001 | Okamoto | 267/64.12 |
| 6,601,834 B2 * | 8/2003 | Perry | 267/64.12 |

OTHER PUBLICATIONS

Patent Cooperation Treaty, International Search Report, Form PCT/ISA/210 (second sheet) (Jul. 1998).

* cited by examiner

*Primary Examiner*—Pam Rodriguez
(74) *Attorney, Agent, or Firm*—Fay Sharpe LLP

(57) ABSTRACT

A lift spring assembly has a compression spring rod with a housing having a longitudinal axis and axially opposite ends, and having a rod member coaxial with the axis and having an inner end in the housing and an outer end axially outwardly of one of the opposite ends. A guide member is provided on the inner end of the rod member for supporting the rod member during movement of the rod member. A first stage spring assembly extends between one of the opposite ends of the housing and the guide member. A second stage spring assembly extends between the other of the opposite ends of the housing and the guide member. A mounting member extending from one of the opposite ends of the housing for mounting the spring rod assembly to a hood assembly. A locking member is pivotally connected to the mounting member and pivots into locking engagement with one of the ends of the housing.

37 Claims, 7 Drawing Sheets

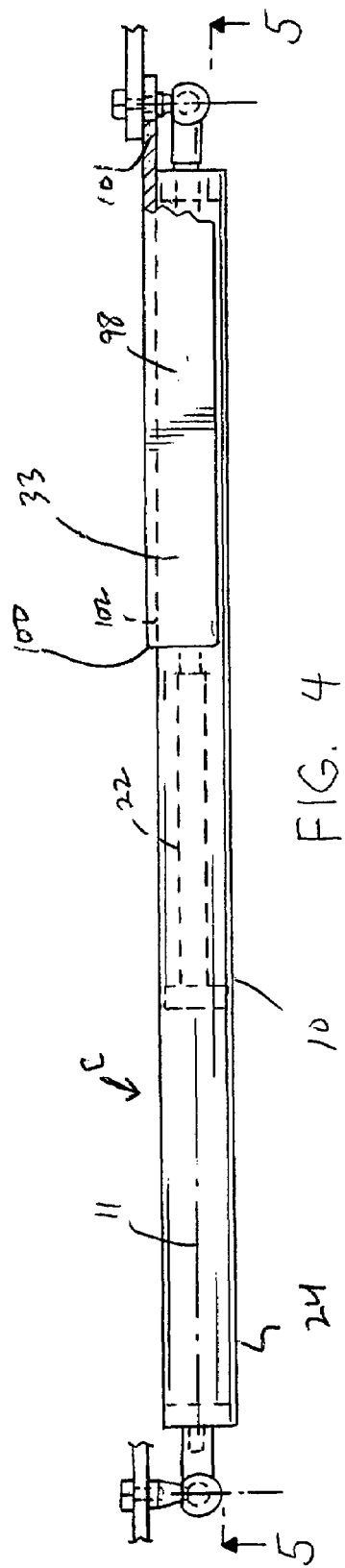
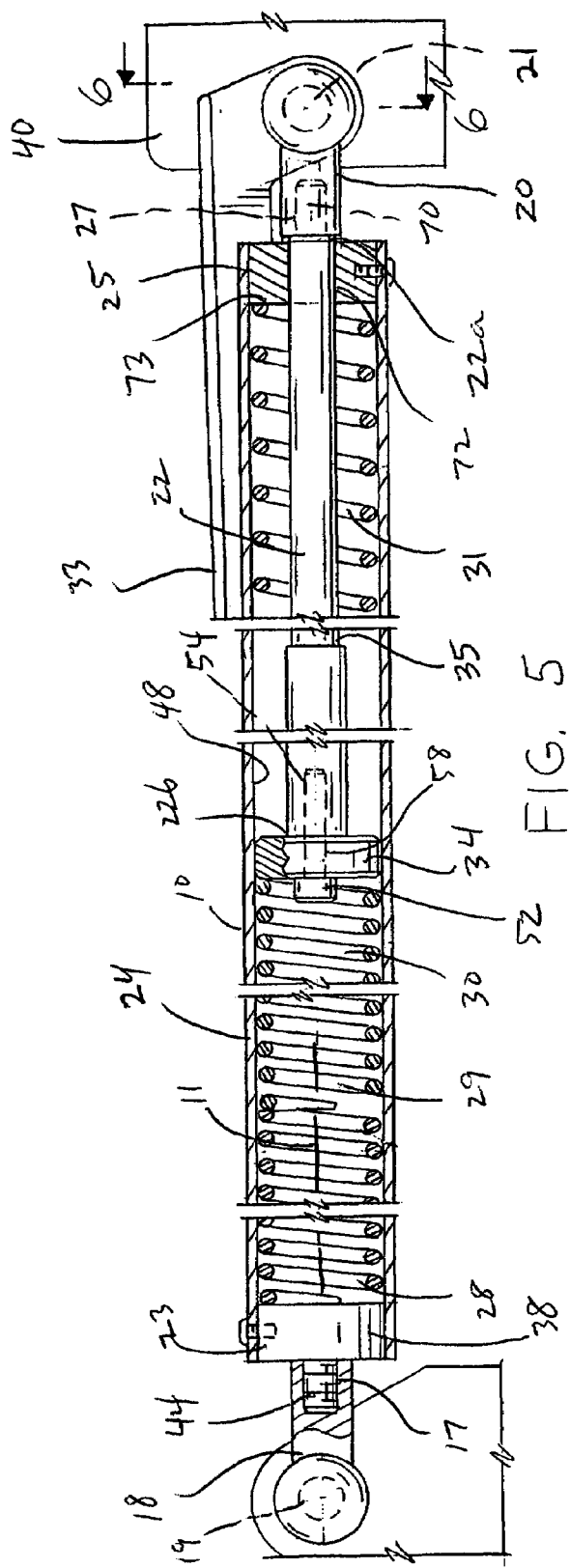
FIG. 4
FIG. 5

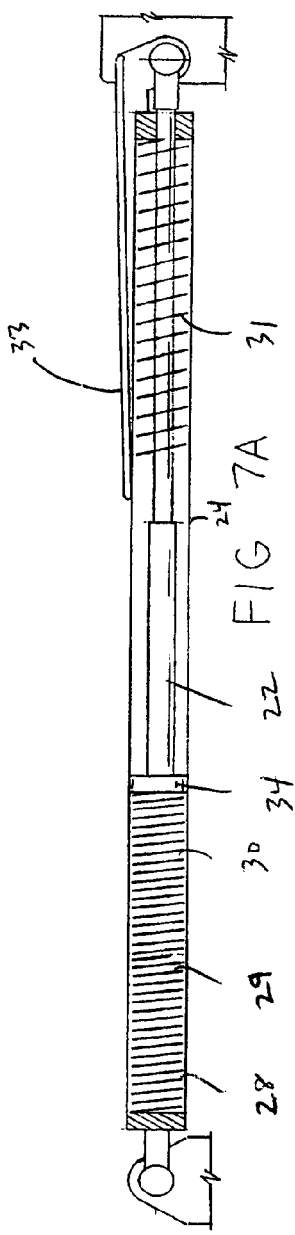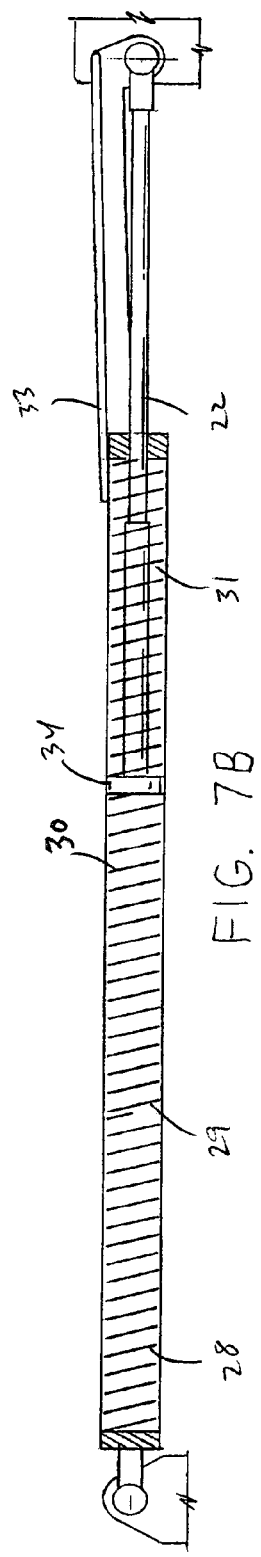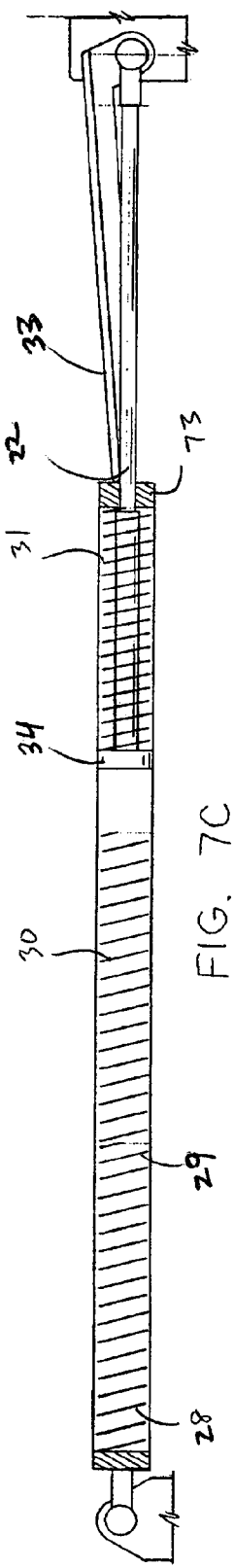

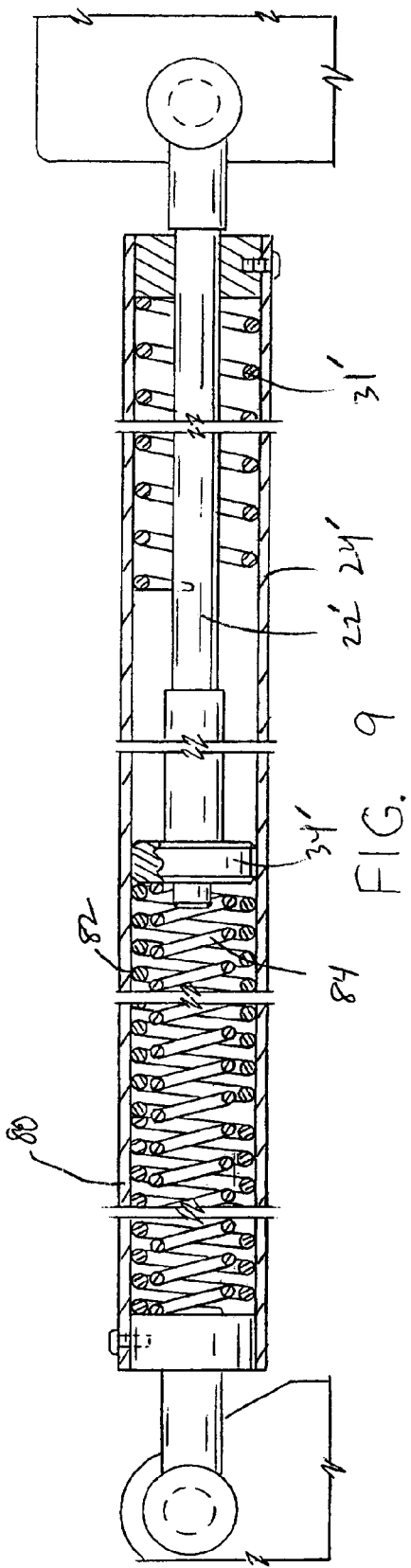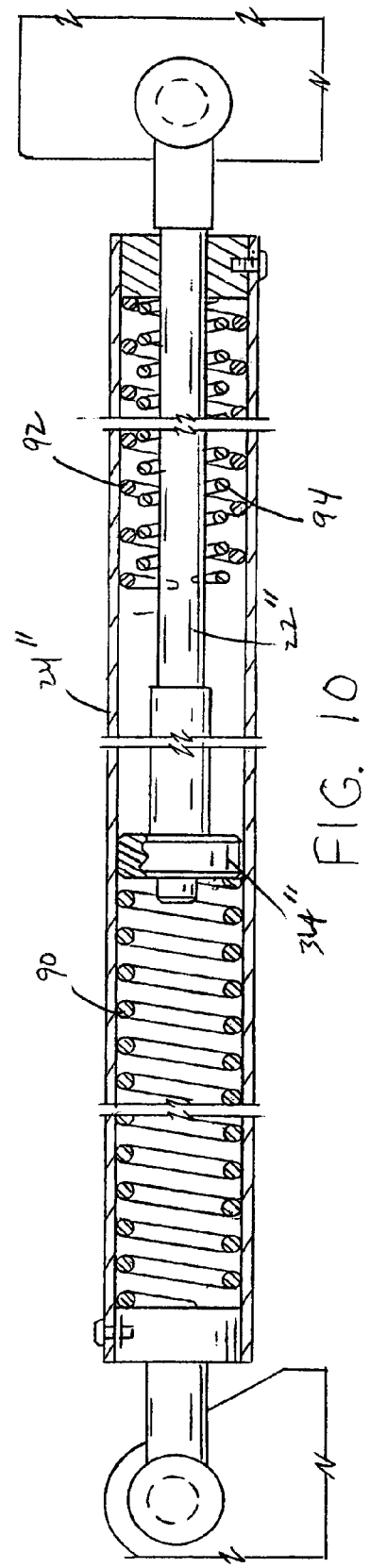

TWO STAGE HOOD LIFT SPRING ASSEMBLY

BACKGROUND OF THE INVENTION

The present invention relates to compression spring rods, and more particularly, to a spring and rod assembly used to lift a bus or vehicle hood in two stages and to secure the hood into place in a fully opened position.

The invention relates to a spring mechanism typically used for biasing hoods, tops, doors, hinged covers, and other elements from a closed to an open position. The invention involves the use of springs in conjunction with a rod member to exert a driving force on the elements to be displaced. The following patents are incorporated herein by reference as background information with regard to spring mechanisms: U.S. Pat. No. 6,199,843 to DeGrace; U.S. Pat. No. 5,810,339 to Küspert, et al.; and U.S. Pat. No. 4,962,916 to Palinkas.

Compression spring rods are used in various applications; for example, to assist in lifting, opening, and damping. Typical applications include lifting a lid hinged to a stationary base. Other applications include lifting and/or balancing elements for a trunk or hood of an automobile. The present invention uses the compression spring rod assembly to assist a hood of a bus during opening of the hood and securing the hood in place in a fully opened position. A two stage spring assembly is used in which the first stage spring assists during the opening process and the second stage spring assembly is used to prevent the hood from falling after passing a center of gravity point of the hood.

Existing mechanical lifts for bus hoods, such as for school busses, use a combination of extension springs and cable for assisting opening and closing of the bus hoods. The force needed to open a school bus hood is typically required to be less than 25 lbs. The existing systems have difficulty meeting this requirement. In contrast, the two stage spring assembly of the present invention only requires approximately 15 lbs. of handle load to open the hood. The system assists the hood in opening, and slows the hood as it approaches the end of the stroke and limits the travel of the hood. Accordingly, it is considered desirable to provide a new and improved two stage spring assembly which overcomes the foregoing difficulties and others while providing better and more advantageous results.

Typically, bus hoods are oriented such that the top of the hood is essentially parallel to the ground thus providing the driver with a limited line of vision with respect to objects or persons in front of the bus. An improved bus hood design provides a downward angle or slope to the top of the hood from the windshield thus providing increased visibility to the area in front of the bus. Thus, the driver has a better view of either objects or children or persons walking in front of or positioned in front of the bus. Thus, the slant or slope design of the hood increases the safety to people around the bus while the bus is either stationary or in transit.

The hood is lifted away from the windshield towards the front of the bus. Once the hood passes a vertical position balanced with respect to its center of gravity, it tends to drop or fall due to gravity and may injure the person opening the hood. Thus, a two stage spring assembly is desired for controlling movement of the hood before and after it reaches a vertical position balanced at its center of gravity.

SUMMARY OF THE INVENTION

The present invention provides an improved compression spring rod assembly which overcomes the above referred-to difficulties and others with regard to such assemblies heretofore available. The compression spring rod assembly utilizes a two stage spring assembly to provide a constant and controlled force to assist in opening of a bus hood until it is positioned over a center of gravity and then a second spring is provided to cushion and limit travel of the hood past the center of gravity so that the hood's movement is slowed or limited and the person opening the hood is not injured.

More particularly, the invention relates to a lift spring assembly, comprising a compression spring rod with a housing having a longitudinal axis and axially opposite ends and a rod member coaxial with the axis and having an inner end in the housing and an outer end axially outwardly of one of the opposite ends and a guide member on the inner end of the rod member for supporting it during movement.

A first spring assembly extends between one of the opposite ends of the housing and the guide member. A second spring assembly extends between the other of the opposite ends of the housing and the guide member. A mounting member extends from one of the opposite ends of the housing for mounting the spring rod assembly to an associated hood assembly. A locking member is pivotally connected to the mounting member and extends along a longitudinal axis of the housing. The locking member pivots into locking engagement with one of the ends of the housing.

In accordance with another aspect of the present invention, a two stage hood lift assembly comprises a hood pivotably mounted to an associated vehicle and a compression spring rod assembly. The spring rod assembly comprises a housing having a longitudinal axis and axially opposite ends, and a rod member coaxial with the axis and having an inner end in the housing and an outer end axially outwardly of one of the opposite ends.

A first stage spring assembly extends along the longitudinal axis of the housing. A second stage spring assembly extends between an end of the first stage spring assembly and an end of the housing.

A mounting member is connected to the outer end of the rod member, and secures the compression rod assembly to the hood. A latch is pivotally connected to the outer end of the member and extends along a longitudinal axis of the housing.

In accordance with yet another aspect of the present invention, a hood lift spring assembly comprises a compression spring rod assembly comprising a housing having a longitudinal axis and axially opposite ends, a rod member coaxial with the axis and having an inner end in the housing and an outer end axially outwardly of one of the opposite ends and a guide member on the inner end of the rod member for supporting it during movement.

A first spring assembly extends between one of the ends of the housing and the guide member, and the second spring assembly extends between the guide member and the other of the ends of the housing. A latch member comprises a spring biased clip attached to an end of the housing, wherein the clip engages a notch within the rod member when the rod member is in an extended position.

The two stage spring assembly has a first stage comprised of several springs stacked on top of each other in series to allow a long travel of the hood in the initial opening process. The first spring assembly may comprise several springs in series or several springs including a center spring positioned or interleaved within the other springs. A second stage spring which may comprise one or two springs acts as a cushion to slow down travel of the hood after it passes over a center of gravity position. The hood would normally begin falling quickly once it passes the center of gravity position and potentially injure a person opening the hood. A latch or clip is used to secure the hood in the fully opened position and prevent it from swinging back to a closed position without first disengaging the latch or clip.

The compression spring rod assembly includes a rod which is adapted to extend and retract relative to a housing. In a typical application, the compression spring builds potential force as the springs are compressed and releases that force once the springs are allowed to expand. This extension of the springs imparts a force to the part connected to the ends of the rod housing and, advantageously, multiple end configurations can be used to adapt the spring rod to a variety of applications. The encased springs minimize load losses over time and do not contain any fluid or gasses within the body. This advantageously eliminates the inevitable problem of leakage and loss of utility.

The second stage spring assembly, which serves as a cushion, comprises a single spring or multiple springs which remain in an extended and relaxed position until the first spring assembly is fully extended, then the spring(s) are compressed due to contact with a guide member or the piston and cushion or slow the travel of the hood once it passes the center of gravity position. As the rod travels during the opening process, a latch moves along with the rod until the hood is fully opened and the second spring assembly begins to be compressed. The latch then falls against an end member of the second spring assembly and prevents movement of the hood backwards to the initial closed position. The latch is manually moved or lifted out of engagement with the end of the spring rod assembly to allow the rod to travel back through the spring housing and allow the hood to be returned to the closed position. Alternatively, a spring loaded latch or clip is positioned on the end of the spring rod housing and engages a notch in the spring rod in the fully opened position. The notch allows for a slight amount of extra travel by the rod until the clip enters the notch and prevents the hood from returning back to the closed position. The spring loaded clip prevents further travel in the forward or backward direction. The spring loaded clip is manually depressed to disengage the clip from the notch and allow the hood and spring rod to travel in the opposite direction and allow the hood to return to a closed configuration.

It is accordingly an object of the present invention to provide an improved compression spring rod assembly with one or more springs for exerting an operating force on a displaceable member at a controlled rate.

Another object of the invention is the provision of a compression spring rod having at least two compression springs interrelated to minimize load losses over time.

A further object of the invention is to provide a two stage compression spring assembly having a first stage spring for assisting opening of a hood and a second stage spring to cushion or slow movement of the hood after it passes a center of gravity position.

A further object of the invention is to provide a latching mechanism which prevents the hood from returning to a closed position after it is extended to the fully opened position.

BRIEF DESCRIPTION OF THE DRAWINGS

The foregoing and other objects and advantages will in part be obvious and in part pointed out in the following description taken together with the accompanying drawings in which:

FIG. 4 is a plan view of a two stage compression spring rod assembly, shown partially in dotted lines, in the fully closed position of FIG. 1;

FIG. 5 shows the compression spring rod assembly in a fully collapsed position shown in partial cross section;

FIG. 7a is a schematic illustration of the two stage compression rod assembly in which the first spring assembly is in the collapsed position and the second spring assembly is in a relaxed uncompressed configuration corresponding to FIG. 1;

FIG. 7b is a schematic illustration of the two stage compression spring rod assembly in which the first stage spring assembly is extended and the hood is balancing over the center of gravity and the second spring assembly is in an uncompressed condition corresponding to FIG. 2;

FIG. 7c is a schematic illustration of the first stage compression spring rod assembly in an extended uncompressed condition and the second stage spring assembly in a compressed configuration with the latch engaging the end of the rod assembly to prevent further backward travel of the rod corresponding to FIG. 3;

FIG. 9 illustrates an alternate embodiment of the present invention in which the first stage compression spring has two outer springs and an central inner spring; and FIG. 10 illustrates an alternate embodiment of the present invention in which the second stage compression spring has a outer and an inner spring interleaved with one another.

DESCRIPTION OF THE PREFERRED EMBODIMENTS OF THE INVENTION

Figure 1:
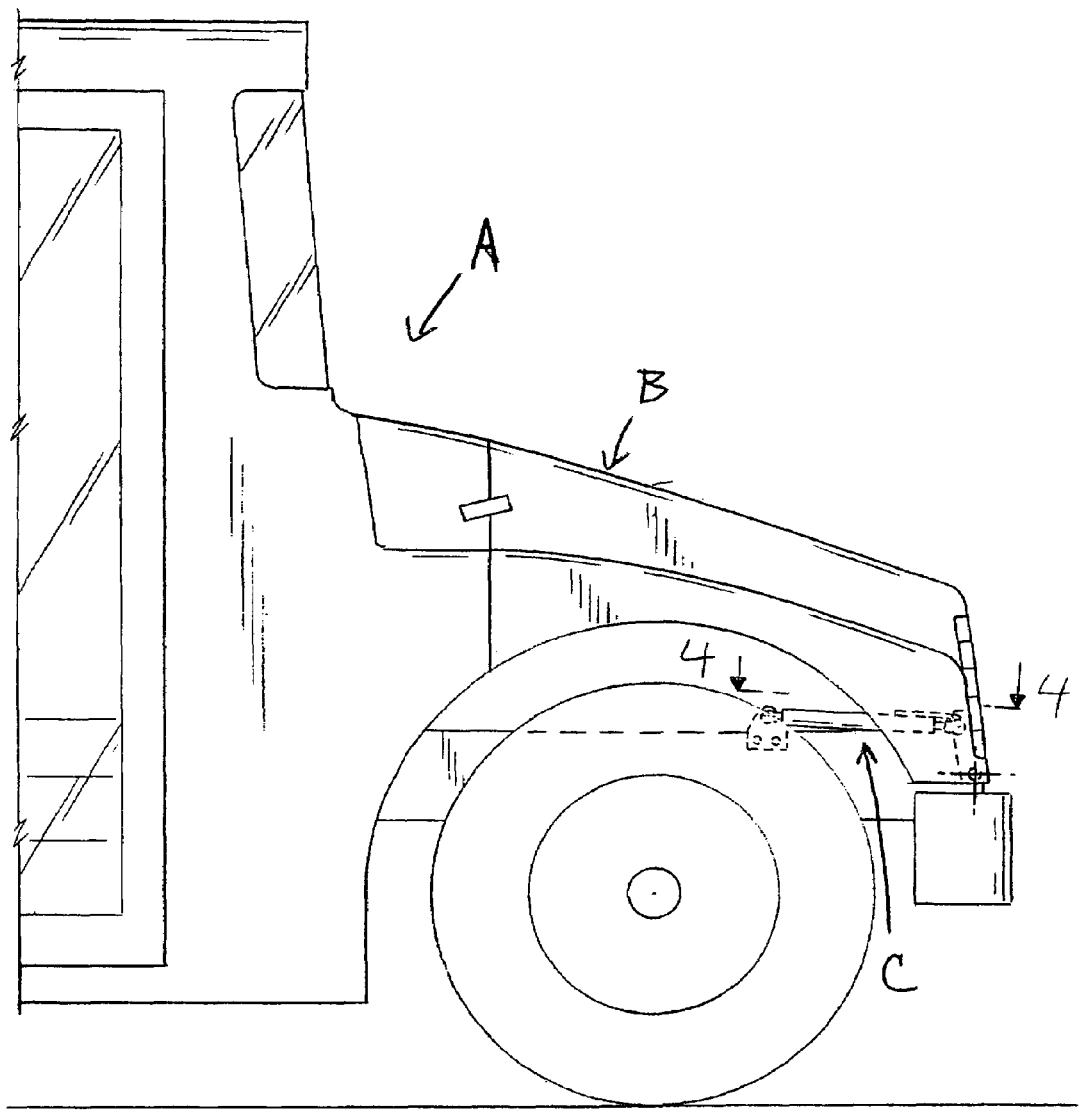
FIG. 1 shows a side elevation view of a vehicle hood and a compression spring rod, shown in dotted lines, in a fully closed position according to a preferred embodiment of the present invention.

Referring now in greater detail to the drawings, wherein the showings are for the purpose of illustrating preferred embodiments of the invention only, and not for the purpose of limiting the invention, FIG. 1 shows a front section of a vehicle A, such as a school bus, with a downwardly sloped or angled hood B pivotally connected to the school bus having a compression spring rod assembly C attached thereto. The hood B is downwardly sloped or angled with respect to the windshield to provide a greater line of vision for the school bus driver. The driver then has an increased line of visibility with respect to objects or persons in front of the bus. FIG. 1 illustrates the hood and compression spring rod assembly in the fully closed and secured position.

Figure 2:
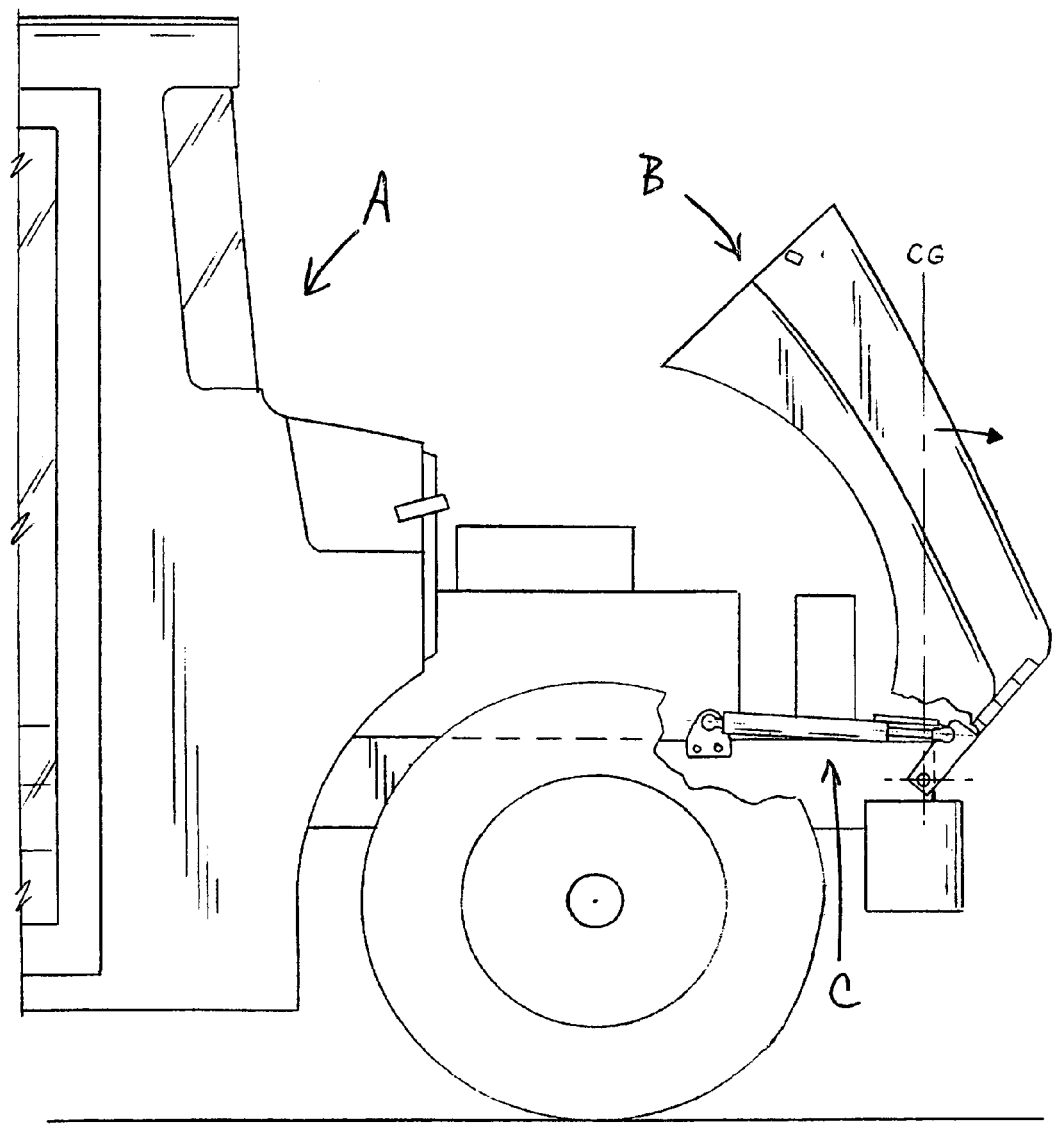
FIG. 2 is a side elevational view of the vehicle hood and the compression spring rod assembly of FIG. 1 where the hood is in a balanced position over the center of gravity of the hood.

FIG. 2 illustrates the hood B and compression rod assembly C where the hood is balanced over the center of gravity of the hood. The hood would then have a tendency to continue travelling in the right hand direction as illustrated by the arrow past the center of gravity to a fully opened position. If the hood's travel is not limited or cushioned, the hood could potentially injure the person who is manually opening the hood. When the hood is in the balanced position over its center of gravity, it is approximately 45 or 46 degrees from vertical.

Figure 3:
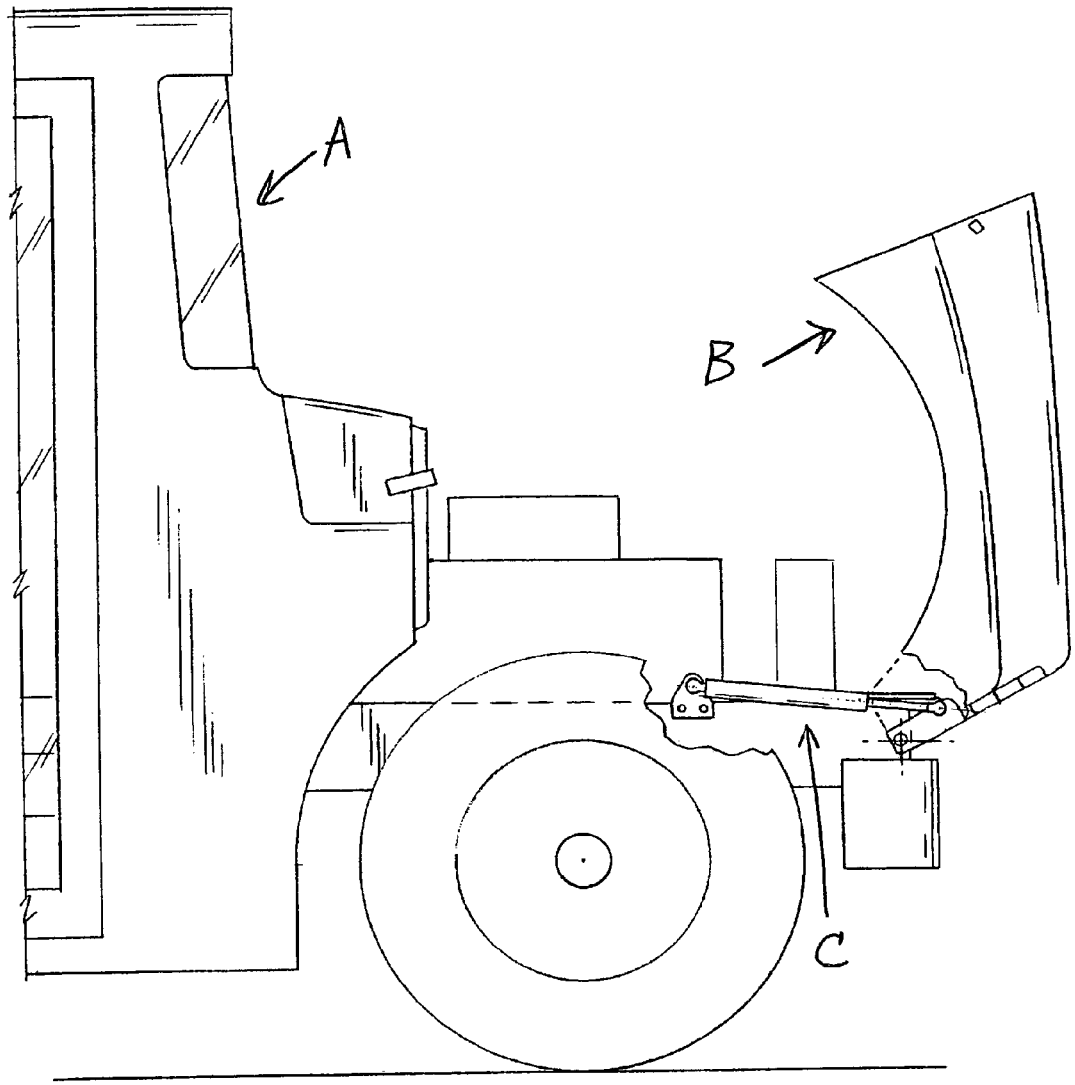
FIG. 3 is a side elevational view of the vehicle hood and compression spring rod assembly of FIG. 1 in which the hood is in a fully opened position.

Referring now to FIG. 3, the hood is shown in the fully opened position past the center of gravity in which the compression rod assembly has cushioned the travel of the hood and has a latch which prevents further movement back toward the closed position. In the fully opened position the hood is positioned at about 68 degrees from vertical.

Referring now to FIGS. 4 and 5, a two stage spring assembly is illustrated which utilizes a first stage spring which is used to open a hood and a second stage spring which is used to prevent the hood from falling after passing a center of gravity point of the hood. The compression spring rod assembly C has a compression spring rod 10 with an axis 11 and a rod member 22 which is axially extendable and retractable relative to a one-piece tubular housing 24. The housing 24 has a longitudinal axis and axially opposite ends. Rod 22 has an outer end 22a axially outwardly of one of the opposite ends of the housing and an inner end 22b. In this embodiment, three compression springs 28, 29, 30 are stacked one on top of the other and are positioned in series with respect to each other. Compression springs 28, 29, 30 form the first stage spring assembly. The compression springs are supported against buckling by interior surface 48 of housing 24. Housing 24 has a mounting end 23 and an outer opposite end 25, and compression springs 28, 29, 30 are axially captured between a tail bushing 38 at mounting end 23 and a guide member or plug 34 mounted at inner end 22b of rod 22. The compression springs 28, 29, 30 bias the rod member toward an extended position of the rod member.

Compression spring rod 10 involves the use of a one-piece housing 24 which facilitates smooth movement of rod 22 and compression springs 28, 29, 30 during operation of the spring rod. Tail bushing 38 has a threaded stud 44 which is received in a threaded recess 17 in a mounting element 18. Rod 22 includes a threaded stud 52 which passes through an opening 58 of guide member 34 and into a threaded bore 54 provided in the rod 22. Lift rod 22 passes through an opening 72 through a rod bushing 73 at outer end 25 of housing 24, and has a threaded stud 70 on outer end 22a thereof which is received in a threaded recess 27 provided in a mounting element 20.

Mounting elements 18 and 20 have openings 19 and 21 therethrough for receiving a variety of different mounting components common in the industry including, for example, pins, bolts, swivels, and the like. The threaded studs 44 and 70 at opposite ends of the spring rod assembly provide for accommodating the use of different mounting elements than those shown so as to modify the assembly for use in a variety of structural environments.

Guide member or plug 34 is slidable in the housing 24 and includes a guide ring of suitable material to facilitate such sliding movement. Rod 22 is slidably supported at end 25 of housing 24 by rod bushing 73 and can be secured to the housing by a pair of set screws or other suitable fasteners having inner ends received in an annular recess in the rod bushing. Referring to FIG. 5, rod 22 has a stepped portion 35 which serves as a stop to prevent overtravel of the rod and potential load damage. Guide member 34 and the rod bushing support the rod 22 for reciprocation in housing 24 between extended and retracted positions to maintain minimal breakaway forces for rod 22. Additionally, guide member 34 and the rod bushing keep rod 22 coaxial with axis 11 and decrease the effect of sideloading on the assembly.

The compression spring rod 10 through the spring-like characteristics of the compression springs 28, 29, 30 serves to provide smooth extension forces to the movement of lift rod 22 from a retracted to an extended position thereof relative to housing 24. Depending on the application, the appropriate load versus deflection can be determined and the corresponding physical elastic properties of the combination of compression springs 28, 29, 30 can then be ascertained. Each compression spring can be fabricated from spring material, such as music wire, and for example ASTM A228 or 302 stainless steel. The springs are captured between bushing 38 and plug 34. FIGS. 4 and 5 illustrate the first stage spring assembly in the compressed configuration.

Figure 6:
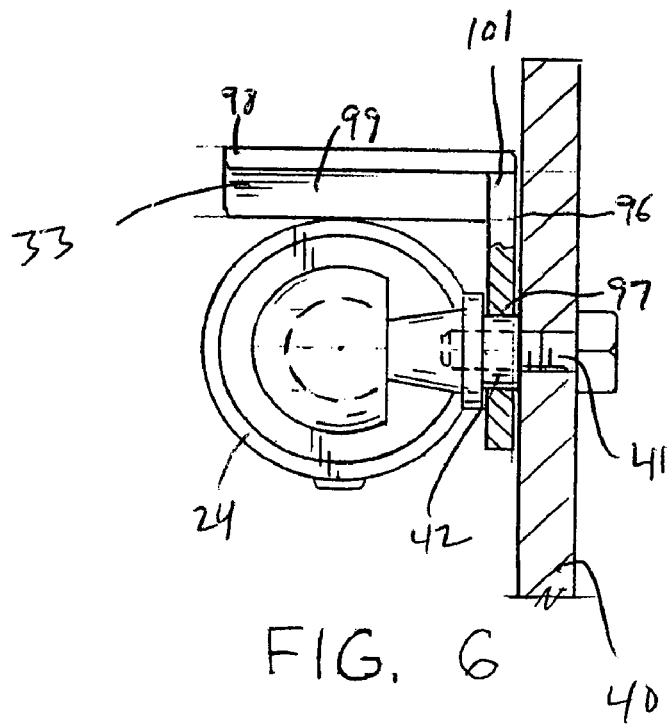
FIG. 6 is a cross-sectional view taken along line 6-6 of FIG. 5 illustrating a latch mechanism and a mount on the hood in which the spring rod assembly is mounted.

Referring now to FIG. 5, a second stage spring assembly which is used to cushion the movement of the hood to the fully opened position, includes a single spring 31 which is positioned between guide plug 34 and bushing 73. As seen in FIG. 5, spring 31 is in the fully relaxed and extended position. FIGS. 5 and 6 also show a latch or locking member 33 which is pivotally connected to mounting element 40 via a bushing or collar 42 on a threaded fastener 41 which extends from the mounting element 40 to a mounting element 20 of the rod and spring assembly. The mounting element 40 mounts the spring rod assembly to a hood assembly. The latch can be fabricated from metal or another suitable material and is shown in FIG. 5 to be an angled metal bar. The latch 33 includes a first arm 96 having an opening 97 therein for pivotably mounting the latch onto mounting element 40 via a fastener or other suitable means. A second arm 98 extends from and is approximately perpendicular to the first arm. Each of the arms has a first end 101, 99, and a second end, 102, 100, respectively. The first ends are pivotally attached at an end of the rod member extending beyond an end of the housing. The latch extends along a longitudinal axis of the housing. A threaded stud extends through the mounting element 40 and secures the compression spring rod and latch in position with respect to the mounting element 40. The latch is used to pivot into locking engagement with an end of the housing.

Referring now to FIGS. 7a-7c, a compression spring rod two stage assembly is schematically illustrated in the fully closed, partially opened and fully opened positions. Referring first to FIG. 7a, the first stage compression spring assembly which comprises springs 28, 29, 30 is shown to be in the compressed configuration. Second stage spring assembly 31 is shown to be in the fully extended or relaxed position. This configuration of the spring rod assembly corresponds to the hood in the fully closed position as shown in FIG. 1. As the hood is opened as illustrated in FIG. 2, the compression spring first stage spring assembly extends as shown in FIG. 7b until the hood is in the balanced position over its center of gravity. At this point, the second stage spring is still not contacting the guide plug or piston 34. The first stage spring assembly is still in a compressed state. Rod 22 extends out of the housing 24 and the latch 33 also is pulled along with the rod as seen in FIG. 7b. As soon as the hood extends past the center of gravity, gravity would tend to pull the hood downwardly and cause it to drop or fall in a rapid manner. To avoid this, the second stage spring 31 begins to be compressed by the guide plug 34 as seen in FIG. 7c, thus slowing down the speed of movement of the hood to the fully opened position. In this configuration, the first stage spring assembly is in a fully extended position. The latch extends further with rod 22 until it drops into engagement with the outer end of the housing at the bushing 73. The end 100 of the second arm of the latch then contacts the bushing as seen in FIG. 7c thus preventing backward movement or movement of the hood back to a closed position. The latch has to be manually disengaged from the end of the bushing and is placed onto the outward edge of the housing 24 to allow the backward travel of the rod from the fully opened position to a fully closed or partially closed position. The latch rides along the outside edge of the housing as the rod moves into the housing.

Figure 8:
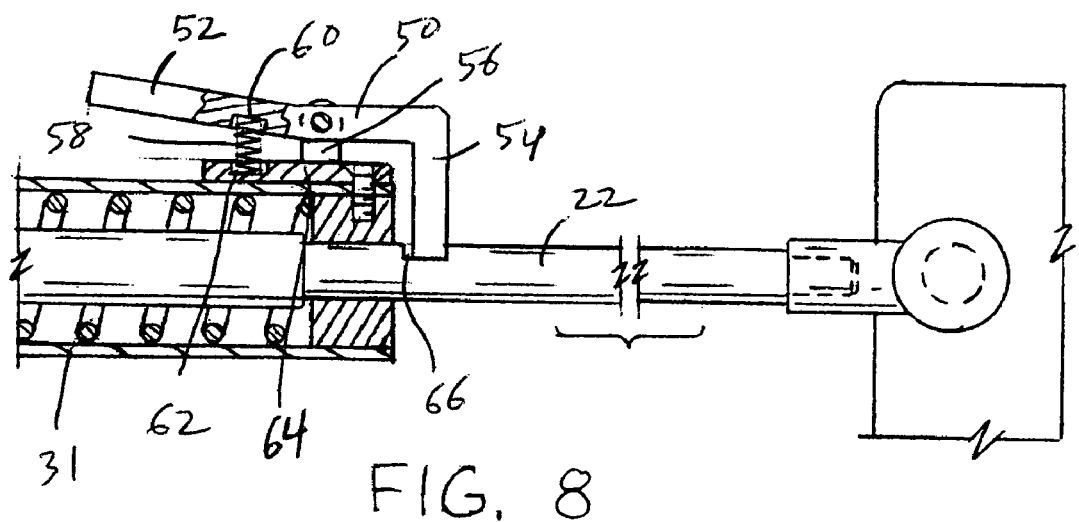
FIG. 8 illustrates an alternate spring loaded clip mechanism for securing the spring rod in the fully extended position to prevent backward or forward travel of the rod.

Referring to FIG. 8, an alternate embodiment of a latching mechanism is illustrated. The compression spring rod assembly is substantially as described for FIGS. 4, 5 and 7. A spring loaded clip or latch 50 includes a first arm 52 and a second arm 54 which is pivotally attached to the end of the housing through a mounting member 56. Spring 58 extends between a notch 60 of arm 52 and a notch 62 of mounting plate 64 positioned on an end of the rod housing. The spring is biased so that the clip arm 54 hangs or extends downwardly as seen in FIG. 8. A notch 66 is formed in rod 22 to secure the rod in the fully opened position. The notch is slightly larger than the end dimension of the arm 54 to provide for slight misalignment between the arm 54 and rod 22 or if the rod and hood need to be slightly pulled further to be secured in the fully opened position. The clip arm 54 drops or falls into notch 66 when the rod is in an extended position thus preventing the rod from further traveling forward or backward to a closed position of the hood. To release the clip from the notch, the arm 52 is manually depressed, thus compressing spring 62 and raising or lifting the arm 54 out of engagement with notch 66.

FIG. 9 illustrates an alternate embodiment of the compression spring rod assembly. Like components to those illustrated in FIGS. 4 and 5 are labeled with numerals with a prime ('). In this embodiment, the first stage compression spring comprises two outer springs 80, 82 and a central, inner spring 84 which is oppositely wound to springs 80, 82. The inner spring is provided to provide greater strength in the spring assembly to provide greater resistance to closing the hood. The second stage spring assembly is a single spring 31' as is shown for the embodiment of FIGS. 1-5.

Another alternate embodiment is illustrated in FIG. 10. Like components to those illustrated in FIGS. 4 and 5 are labeled with numerals with a double prime ("). In this embodiment, the first stage compression spring is a single continuous spring 90 and the second stage spring assembly comprises an outer spring 92 and an inner oppositely wound spring 94. In this configuration, the inner spring on the second stage spring assembly provides greater strength and resistance to the hood being opened past the center of gravity to the fully opened position.

While considerable emphasis has been placed herein on the structures and configurations of the preferred embodiments of the invention, it will be appreciated that other embodiments, as well as modifications of the embodiments disclosed herein, can be made without departing from the principles in the invention. In this respect, it will be appreciated that the spring rod can be used in applications other than those disclosed herein. Similarly, multiple combinations of coaxial and surrounding springs (i.e., 3, 4, etc.) may be configured to meet the desired load vs. deflections for a particular application. Likewise, it will be appreciated that the spring rod according to the invention can be secured to relatively displaceable components in any number of different ways. Furthermore, the use of a compression spring rod and the latching mechanisms described hereinabove can be used in other applications beyond a bus hood. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

Having thus described the preferred embodiment, the invention is now claimed to be:

1. A lift spring assembly, comprising:
    a compression spring rod assembly comprising a housing having a longitudinal axis and axially opposite ends;
    a rod member coaxial with said axis and having an inner end in said housing and an outer end axially outwardly of one of said opposite ends;
    a bushing adjacent said one of said opposite ends of said housing supporting said rod member for reciprocation axially of said housing between extended and retracted positions relative thereto;
    a guide member on said inner end of said rod member for supporting said rod member during movement of said rod member;
    a first spring assembly extending between one of said opposite ends of said housing and said guide member;
    a second spring assembly extending between the other of said opposite ends of said housing and said guide member;
    a mounting member extending from one of said opposite ends of said housing for mounting said spring rod assembly to an associated hood assembly;
    a locking member rotatably connected to said mounting member and extending along said axis of said housing, wherein said locking member pivots into locking engagement with one of said ends of said housing in response to compression of one of said first spring assembly and said second spring assembly and extension of one of said first spring assembly and said second spring assembly;
    wherein said locking member is of a one-piece construction and comprises a first arm having an opening therein for pivotally mounting said locking member onto said mounting member via a fastener; and,
    wherein said locking member further comprises a second arm extending at substantially 90 degrees from said first arm wherein each of said arms comprises a first end and a second end, wherein said first ends are pivotally attached to an end of said rod member extending beyond an end of said housing.

2. The lift spring assembly of claim 1, wherein said first spring assembly comprises three springs adjacent each other in a stacked relationship.

3. The lift spring assembly of claim 1, wherein said first spring assembly is in a compressed configuration when said associated hood is in a closed position.

4. The lift spring assembly of claim 3, wherein said second spring assembly is in an extended position when said associated hood is in a closed position.

5. The lift spring assembly of claim 1, wherein said second spring assembly extends between said guide member and said rod bushing coaxial with said axis for biasing said rod member toward the extended position thereof.

6. The lift spring assembly of claim 1, wherein said first spring assembly is in a fully extended position and said second spring assembly is in a compressed position when said associated hood is in a fully opened position.

7. The lift spring assembly of claim 1, wherein said first spring assembly is partially compressed and said second spring assembly engages said bushing of said rod assembly as the associated hood is balanced over its center of gravity.

8. The lift spring assembly of claim 1, wherein said locking member second arm engages one of said ends of said housing when said rod is in a fully extended position, thus preventing backward movement of said rod.

9. A two stage hood lift assembly, comprising:
a hood pivotably mounted to an associated vehicle;
a compression spring rod assembly, comprising:
   a housing having a longitudinal axis and axially opposite ends;
   a rod member coaxial with said axis and having an inner end in said housing and an outer end axially outwardly of one of said opposite ends;
   a first stage spring assembly extending along said longitudinal axis of said housing;
   a second stage spring assembly extending between an end of said first stage spring assembly and an end of said housing;
   a mounting member connected to said outer end of said rod member, said mounting member secures said compression rod assembly to said hood; and,
   a latch adjacent to and rotatably connected to said outer end of said mounting member, said latch member extends along said longitudinal axis of said housing, wherein said latch pivots into a locking position by contacting an end of said housing when said rod member is in an extended position in response to one of said first stage spring assembly and said second stage spring assembly being compressed and the other of said first stage spring assembly and said second stage spring assembly being extended;
   wherein said latch is formed of one piece and has two arms substantially 90 degrees from each other.

10. The two stage hood lift assembly of claim 9, further comprising a bushing adjacent said one of said opposite ends of said housing supporting said rod member for reciprocation axially of said housing between extended and retracted positions relative thereto.

11. The two stage hood lift assembly of claim 10, wherein said first stage spring assembly comprises three springs adjacent each other in a stacked relationship.

12. The two stage hood lift assembly of claim 10, wherein said second stage spring assembly extends between said guide member and said rod bushing coaxial with said axis for biasing said rod member toward the extended position thereof.

13. The two stage hood lift assembly of claim 10, wherein said first stage spring assembly is partially compressed and said second stage spring assembly engages said bushing of said rod assembly as the hood is balanced over its center of gravity.

14. The two stage hood lift assembly of claim 9, wherein said first stage spring assembly is in a compressed configuration when said hood is in a closed position.

15. The two stage hood lift spring assembly of claim 9, wherein said second stage spring assembly is in an extended position when said hood is in a closed position.

16. A two stage hood lift assembly comprising:
a hood pivotably mounted to an associated vehicle;
a compression spring rod assembly, comprising:
   a housing having a longitudinal axis and axially opposite ends;
   a rod member coaxial with said axis and having an inner end in said housing and an outer end axially outwardly of one of said opposite ends;
   a first stage spring assembly extending along said longitudinal axis of said housing;
   a second stage spring assembly extending between an end of said first stage spring assembly and an end of said housing;
   a mounting member connected to said outer end of said rod member, said mounting member secures said compression rod assembly to said hood;
   a latch rotatably connected to said outer end of said rod member, said latch extends along said axis of said housing, wherein said latch comprises a first arm having an opening therein for rotatably mounting said latch onto said mounting member via a fastener, wherein said latch further comprises a second arm extending from said first arm at a substantially 90-degree angle, wherein each of said arms comprises a first end and a second end, wherein said latch rotates when one of said first stage spring assembly and said second stage spring assembly is extended.

17. The two stage hood lift assembly of claim 16, wherein said first stage spring assembly is in a fully extended position and said second stage spring assembly is in a compressed position when said hood is in a fully opened position.

18. The two stage hood lift assembly of claim 16, wherein said latch engages one of said ends of said housing when said rod member is in a fully extended position, thus preventing backward movement of said rod member.

19. A lift spring assembly, comprising:
a compression spring rod assembly comprising a housing having a longitudinal axis and axially opposite ends;
a rod member coaxial with said axis and having an inner end in said housing and an outer end axially outwardly of one of said opposite ends;
a guide member on said inner end of said rod member for supporting said rod member during movement of said rod member;
a first spring assembly extending between one of said opposite ends of said housing and said guide member;
a second spring assembly extending between the other of said opposite ends of said housing and said guide member;
a mounting member extending from one of said opposite ends of said housing for mounting said spring rod assembly to an associated hood assembly; and,
a locking member rotatably mounted to said mounting member and which rotates with respect to said mounting member, via an arm of said locking member, wherein said locking member is spaced apart from said housing and contacts only a distal end of said housing when said rod member is in an extended position; said locking member has a first arm of uniform width extending along its length and a length of said spring rod assembly;
wherein said locking member rotates when one of said first spring assembly and said second spring assembly moves.

20. The lift spring assembly of claim 19, further comprising a bushing adjacent said one of said opposite ends of said housing supporting said rod member for reciprocation axially of said housing between extended and retracted positions relative thereto.

21. The lift spring assembly of claim 20, wherein said second spring assembly extends between said guide member and said rod bushing coaxial with said axis for biasing said rod member toward the extended position thereof.

22. The lift spring assembly of claim 20, wherein said first spring assembly is partially compressed and said second spring assembly engages said bushing of said rod assembly as the associated hood is balanced over its center of gravity.

23. The lift spring assembly of claim 19, wherein said first spring assembly is in a compressed configuration when said associated hood is in a closed position.

24. The lift spring assembly of claim 19, wherein said second spring assembly is in an extended position when said associated hood is in a closed position.

25. The lift spring assembly of claim 19, wherein said first spring assembly is in a fully extended position and said second spring assembly is in a compressed position when said associated hood is in a fully opened position.

26. The lift spring assembly of claim 19, wherein said first spring assembly comprises a single continuous spring.

27. The lift spring assembly of claim 26, wherein said second spring assembly comprises a first outer spring and a second inner spring positioned within said outer spring.

28. The lift spring assembly of claim 27, wherein said second inner spring is oppositely wound from said first outer spring.

29. The lift spring assembly of claim 19, wherein said first spring assembly comprises three springs adjacent each other in a stacked relationship.

30. The lift spring assembly of claim 29, wherein said second spring assembly comprises a first outer spring and a second inner spring positioned within said outer spring.

31. The lift spring assembly of claim 30, wherein said second inner spring is oppositely wound from said first outer spring.

32. The lift spring assembly of claim 30, wherein said inner spring is oppositely wound to said first and second outer springs.

33. The lift spring assembly of claim 29, wherein said second spring assembly comprises a single continuous spring.

34. The lift spring assembly of claim 19, wherein said first spring assembly comprises first and second outer springs and an inner spring positioned within said first and second outer springs.

35. The lift spring assembly of claim 34, wherein said second spring assembly comprises a first outer spring and a second inner spring positioned within said outer spring.

36. The lift spring assembly of claim 35, wherein said second inner spring is oppositely wound from said first outer spring.

37. The lift spring assembly of claim 34, wherein said second spring assembly comprises a single continuous spring.

* * * * *